(12) United States Patent
Chen

(10) Patent No.: US 6,397,086 B1
(45) Date of Patent: May 28, 2002

(54) HAND-FREE OPERATOR CAPABLE OF INFRARED CONTROLLING A VEHICLE'S AUDIO STEREO SYSTEM

(75) Inventor: Tonny Chen, Chang-Hua (TW)

(73) Assignee: E-Lead Electronic Co., Ltd., Chang-Hua (TW)

( * ) Notice: Subject to any disclaimer, the term of this patent is extended or adjusted under 35 U.S.C. 154(b) by 0 days.

(21) Appl. No.: 09/337,662

(22) Filed: Jun. 22, 1999

(51) Int. Cl.[7] .............................. H04M 1/00; H04B 1/38
(52) U.S. Cl. ..................... 455/569; 455/556; 455/79; 455/563; 704/239
(58) Field of Search .................... 455/569, 568, 455/565, 90, 575, 563, 414, 556, 557, 66, 572, 79; 379/353–361, 447–450; 704/231–257

(56) References Cited

U.S. PATENT DOCUMENTS

| | | | | |
|---|---|---|---|---|
| 4,698,838 A | * | 10/1987 | Ishikawa et al. | ............ 455/569 |
| 4,723,265 A | * | 2/1988 | Kamei et al. | ................ 455/564 |
| 5,444,673 A | * | 8/1995 | Mathurin | ..................... 368/63 |
| 5,867,794 A | * | 2/1999 | Hayes et al. | ................ 455/557 |
| 5,974,333 A | * | 10/1999 | Chen | ........................... 455/569 |
| 5,991,640 A | * | 11/1999 | Lilja et al. | ................... 455/557 |
| 6,134,456 A | * | 10/2000 | Chen | ........................... 455/569 |
| 6,223,029 B1 | * | 4/2001 | Stenman et al. | ............ 455/420 |
| 6,295,448 B1 | * | 9/2001 | Hayes, Jr. et al. | .......... 422/420 |

FOREIGN PATENT DOCUMENTS

JP          403277043 A   * 12/1991

* cited by examiner

*Primary Examiner*—Edward F. Urban
*Assistant Examiner*—Charles Craver
(74) *Attorney, Agent, or Firm*—Rosenberg, Klein & Lee (57) ABSTRACT

The disclosure relates to an infrared controlled hand-free operator for cellular phones housed in a vehicle. More particularly, it is concerned with a hand-free operator which can automatically transmit an infrared signal similar to a control signal of a vehicle's audio stereo system to turn the stereo system off or mute when income signals are received by a cellular phone mounted to a vehicle. The hand-free operator thus can automatically cut off the noise sound of an audio stereo system in operation so as to make the operation of a cellular phone free of interference in a vehicle on the move.

7 Claims, 8 Drawing Sheets

HAND-FREE OPERATOR CAPABLE OF INFRARED CONTROLLING A VEHICLE'S AUDIO STEREO SYSTEM

BACKGROUND OF THE INVENTION

The present invention relates to hand-free operator for cellular phones housed in a vehicle. More particularly, it relates to a hand-free operator which can automatically transmit an infrared signal analogous to a control signal of a vehicle audio stereo system to turn the stereo system off or mute when income signals are received by a cellular phone mounted to a vehicle. It thus can prevent the audio stereo system in operation from interfering with the reception of message of the cellular phone.

In consideration of driving safety, various kinds of hand-free operators for cellular phones have been widely adopted as an indispensable facility on vehicles. The present inventor has developed a prior art hand-free operator which can automatically turn a vehicle audio stereo system off or mute when a cellular phone receives income signals, and resume the normal functions of the vehicle audio stereo system at the end of a cellular phone's operation. Such a design was a breakthrough in this field and benefited a lot of people in practical use. However, such a kind of hand-free operator must be generally handled by professional technicians because of its complicated wiring arrangement. It is not easy for general people to get such a hand-free operator installed in a DIY manner.

The inventor noticed the installation problem which hinders the wide application of such a hand-free operator to general cellular phones. He was devoted to come up with a hand-free operator equipped with an infrared operated remote control means so as to permit a vehicle audio stereo system to be remotely controlled of its on and off operation, volume level and functional modes, such as a CD player or a tape player and etc. Therefore, the present invention adopts an infrared emitter in a hand-free operator which can control a vehicle audio stereo system to stop or become mute when a cellular phone is receiving income signals, permitting a person to use the cellular phone without interference.

SUMMARY OF THE INVENTION

Therefore, the primary object of the present invention is to provide a hand-free operator for cellular phones mounted to vehicles, which can particularly control the audio stereo system of a vehicle by way of an infrared signal to turn off or mute when income signals are received by a cellular phone mounted to a vehicle. Thereby, the operation of a cellular phone will not be interfered by loud noise of a vehicle's audio stereo system in operation, making the operational safety and facility of a vehicle effectively increased.

DETAILED DESCRIPTION OF PREFERRED EMBODIMENTS

Figure 1:
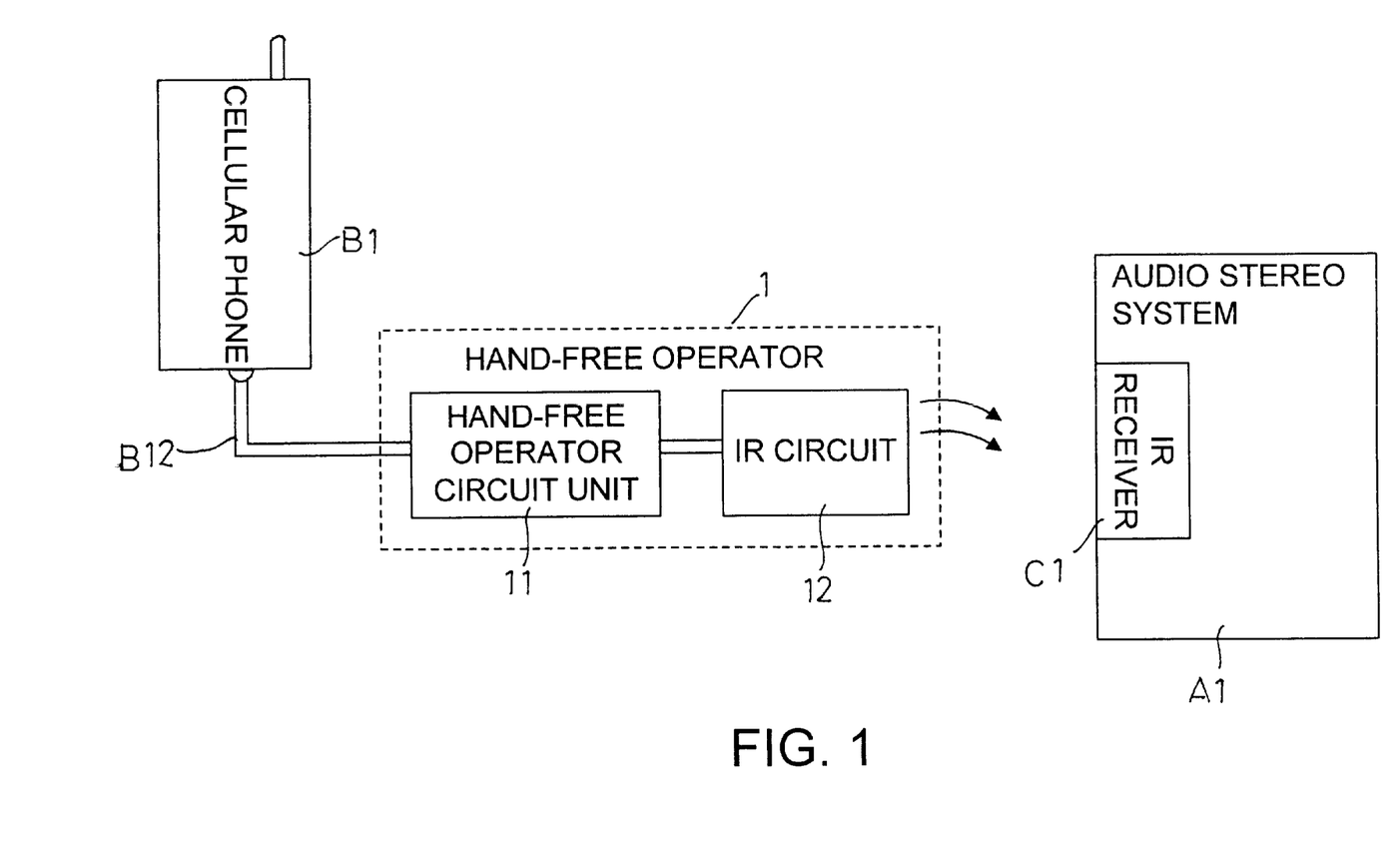
FIG. 1 is a block diagram showing a first embodiment of the present invention.

Referring to 1, the block diagram of a first preferred embodiment of the present invention is illustrated. This hand-free operator for use in a cellular phone is particularly capable of infrared controlling an audio stereo system of a vehicle. It comprises a hand-free operator embodiment 1 and a signal cable B12 selectively adaptable for various types of cellular phones B1 and an infrared receiver C1 compatible with a vehicle's audio stereo system A1.

This hand-free operator embodiment 1 comprises a hand-free operator circuit unit 11 and an infrared circuit unit 12. The hand-free operator circuit unit 11 enables a cellular phone B1 to receive income signals hand-freely. The infrared circuit unit 12 services to generate and transmit infrared signals analogous to infrared control signals of the vehicle's audio stereo system A1 when income signals are received by said cellular phone so that the audio stereo system A1 in operation will be turned off or mute.

The signal cable B12 is used to connect the hand-free operator embodiment 1 to the cellular phone B1 for transmission of signals and is selectively replaced to conform to different plug sockets of various types of cellular phones.

Thereby, when the cellular phone B1 is receiving income signals, the signals will be transmitted to the hand-free operator circuit unit 11 by way of the signal cable B12. After the circuit unit 11 detects income signals, the infrared circuit unit 12 will be activated by the circuit unit 11 to issue an infrared control signal. This signal analogous to an infrared control signal of the vehicle audio stereo system A1 is transmitted to the infrared receiver C1 of the audio stereo system A1 to turn the same off or mute. On the completion of the operation of the cellular phone, another signal will be sent off to resume the original mode the audio stereo system. Therefore, no special wiring know-how is needed in this installation in one aspect and it facilitates a driver to take message directly when his or her cellular phone is receiving signals with a vehicle's audio stereo system in operation automatically turned off or mute temporarily.

Figure 2:
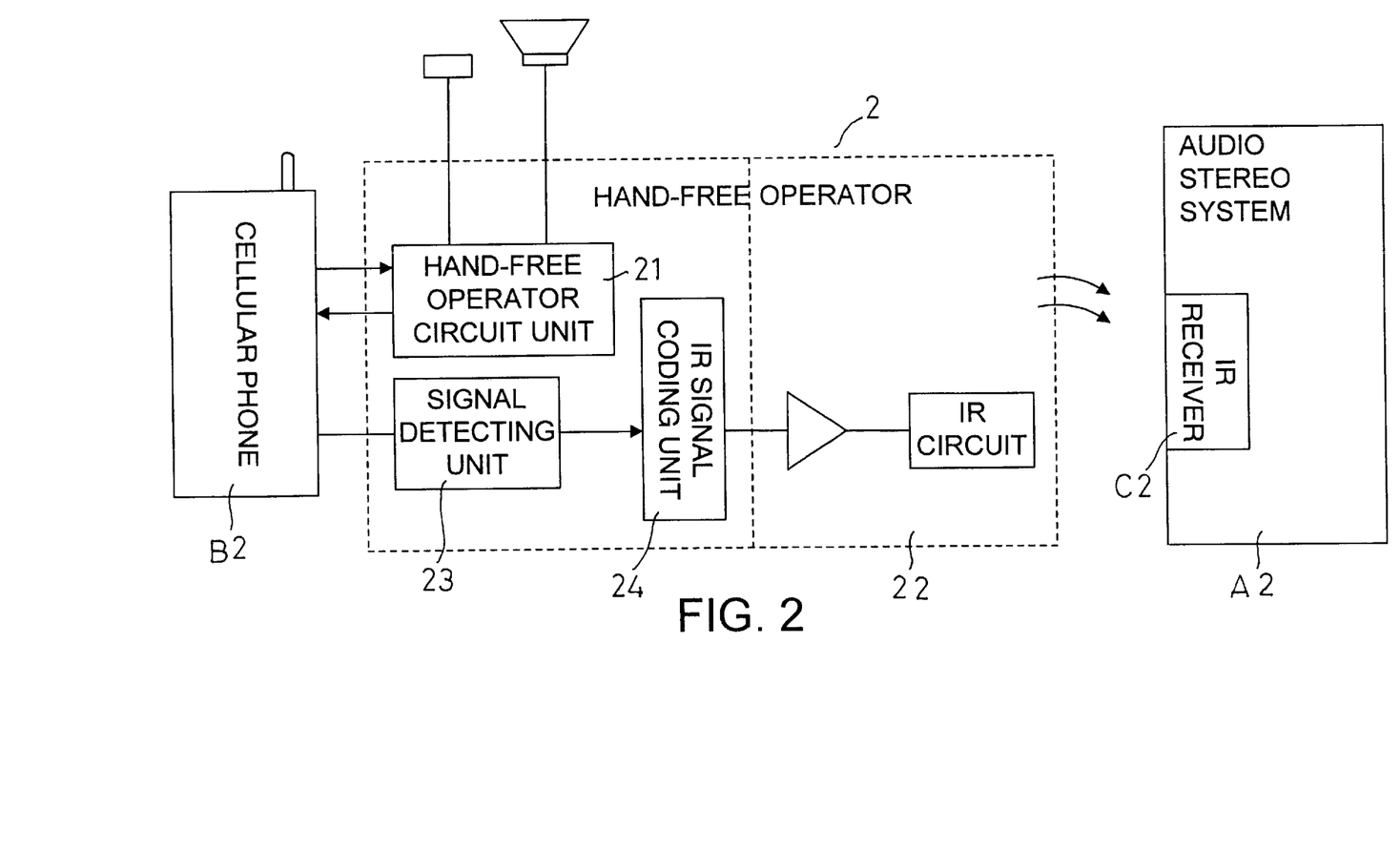
FIG. 2 is a block diagram showing a second embodiment of the present invention.
Figure 3:
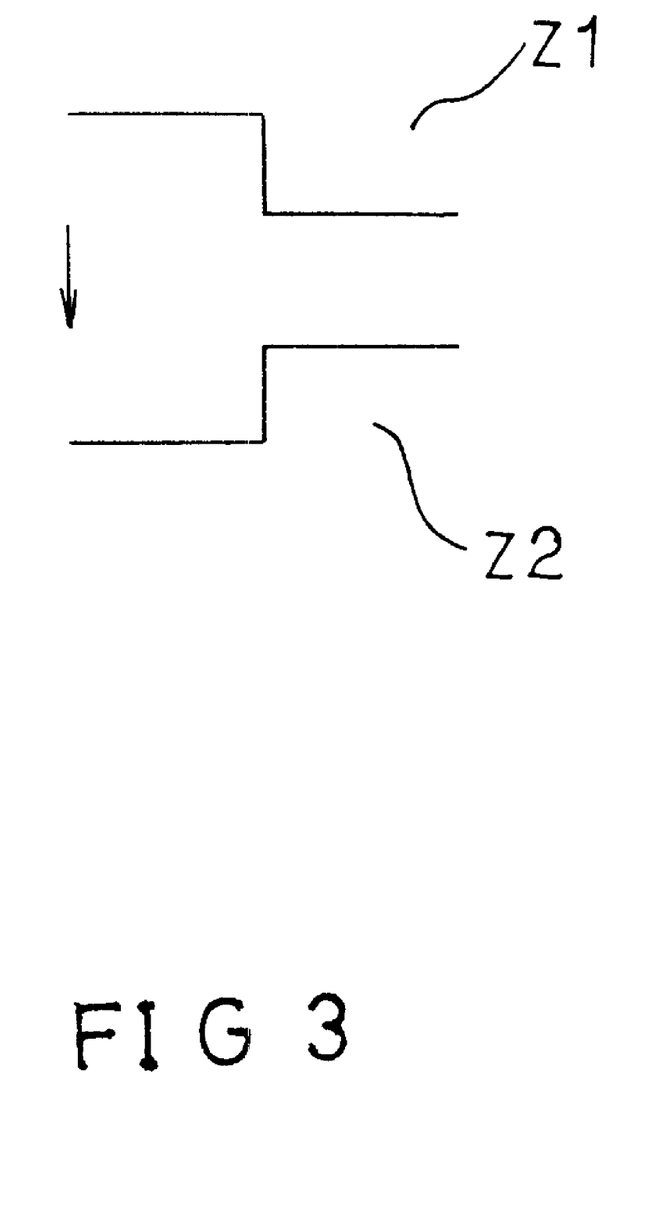
FIG. 3 is a diagram showing a cellular phone in operation receiving income signals.

Referring to FIG. 2, the block diagram of the second embodiment is illustrated. This embodiment is designed on the ground that in a stand-by status, some types of cellular phones B2 will fixedly deliver a HI or LO signal as shown in FIG. 3. When income signals are received by a cellular phone, this HI (Z1) or LO(Z2) signal will be inversely converted to a LO or (HI) signal. Therefore, in addition to the hand-free operator circuit unit 21 and the infrared circuit unit 22 in the hand-free operator embodiment 2, an infrared signal coding unit 24 and an income signal detecting unit 23 are installed.

As income signals are received by a cellular phone, the stand-by signal Z1 or Z2 of the cellular phone will change from HI (or LO) into LO (HI), and the income signal detecting unit 23 will identify such a variation. In response, the detecting unit 23 will activate the infrared signal coding unit 24 to deliver an infrared signal to control the vehicle audio stereo system A2. Then, the infrared circuit unit 22 is made to send off a signal to the infrared receiver C2 of a vehicle audio stereo system to get the audio stereo system A2 turned off or mute.

Figure 4:
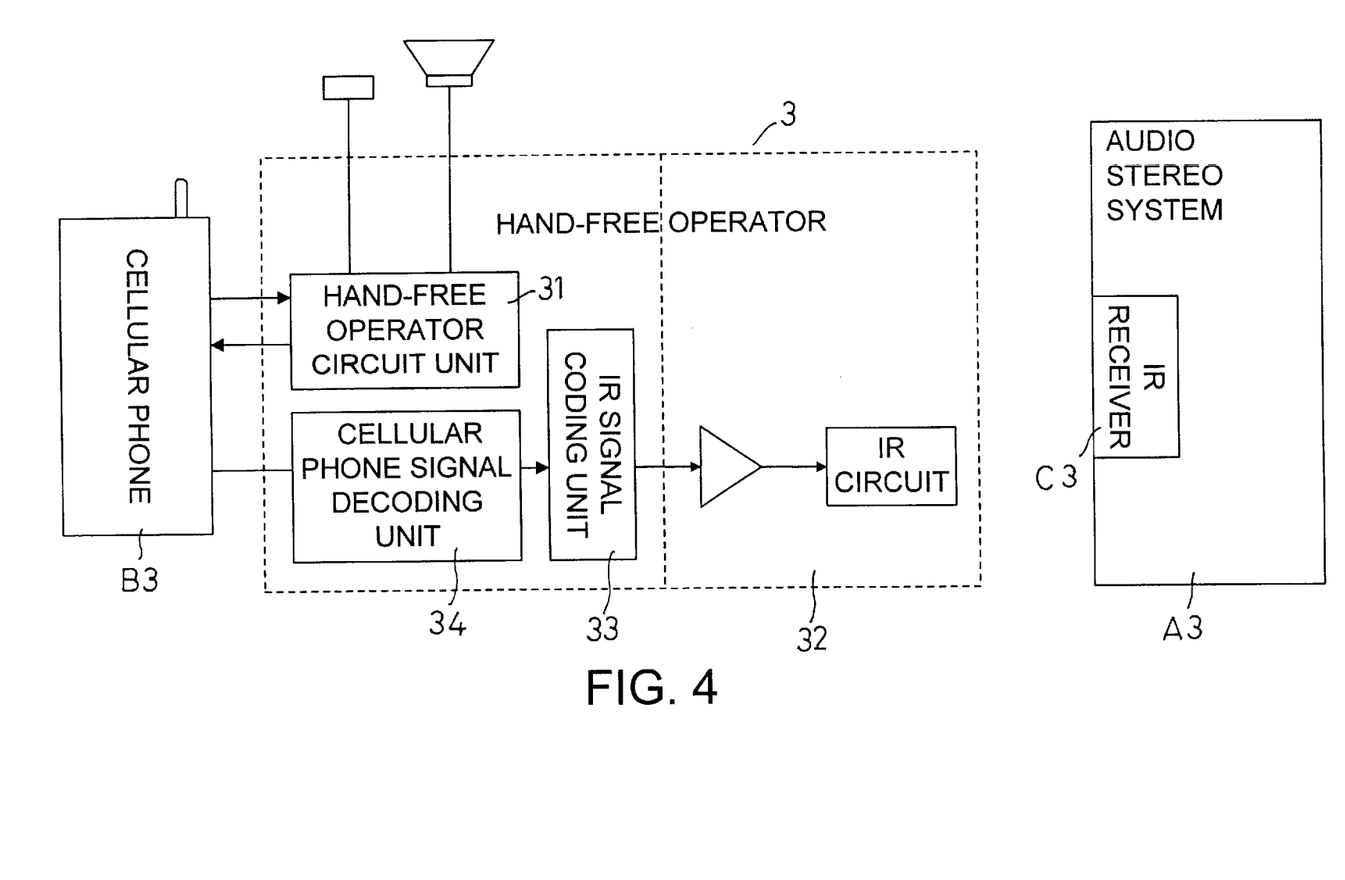
FIG. 4 is a block diagram showing a third embodiment of the present invention.
Figure 5:
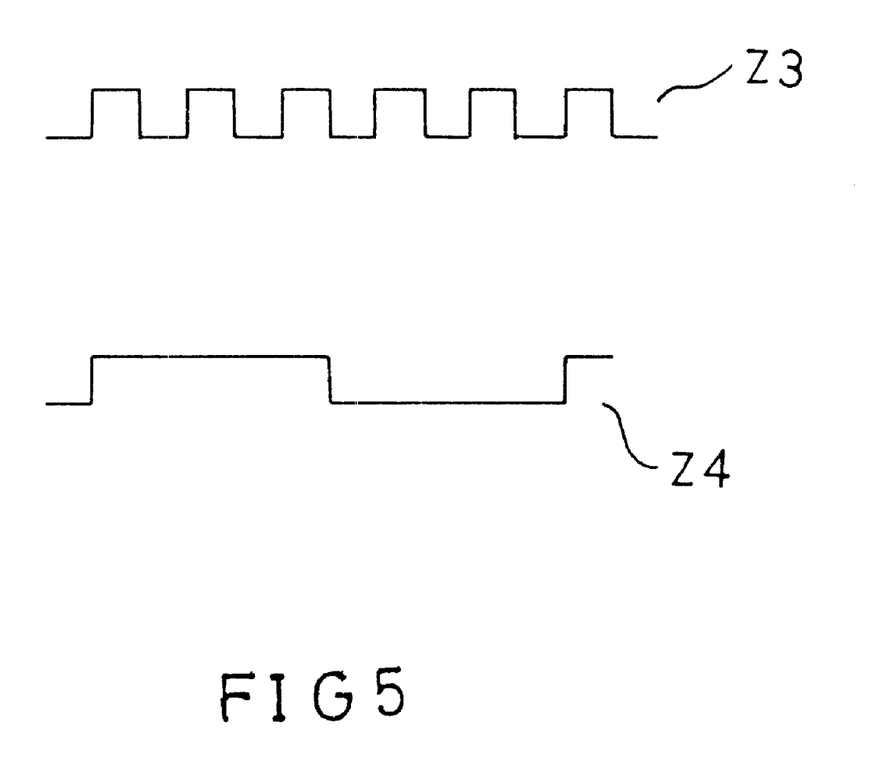
FIG. 5 is a diagram showing a cellular phone in operation receiving income signals.

Referring to FIG. 4, the block diagram of the third embodiment of the present invention is illustrated. It is designed on the ground that for some types of cellular phones, a serial signal Z3 will be produced when a cellular phone B3 is put in a stand-by status, as shown in FIG. 5. As income signals are being received by a cellular phone, the serial signal Z3 will vary in its frequency as indicated by Z4. For this concept, in addition to a hand-free operator circuit unit 31, an infrared circuit unit 32 and an infrared signal coding unit 33, an extra cellular phone signal decoding unit 34 is added. As income signals B3 are received by the cellular phone B3, the serial stand-by signal Z3 is varied. This variation is identified by the cellular phone signal decoding unit 34, and then the infrared signal coding unit 33 issues an infrared signal controlling the vehicle audio stereo system A3 accordingly. Next, the infrared circuit unit 32 transmits a signal to the infrared receiver C3 of the audio stereo system A3 to turn the stereo system A3 off or mute temporarily.

Figure 6:
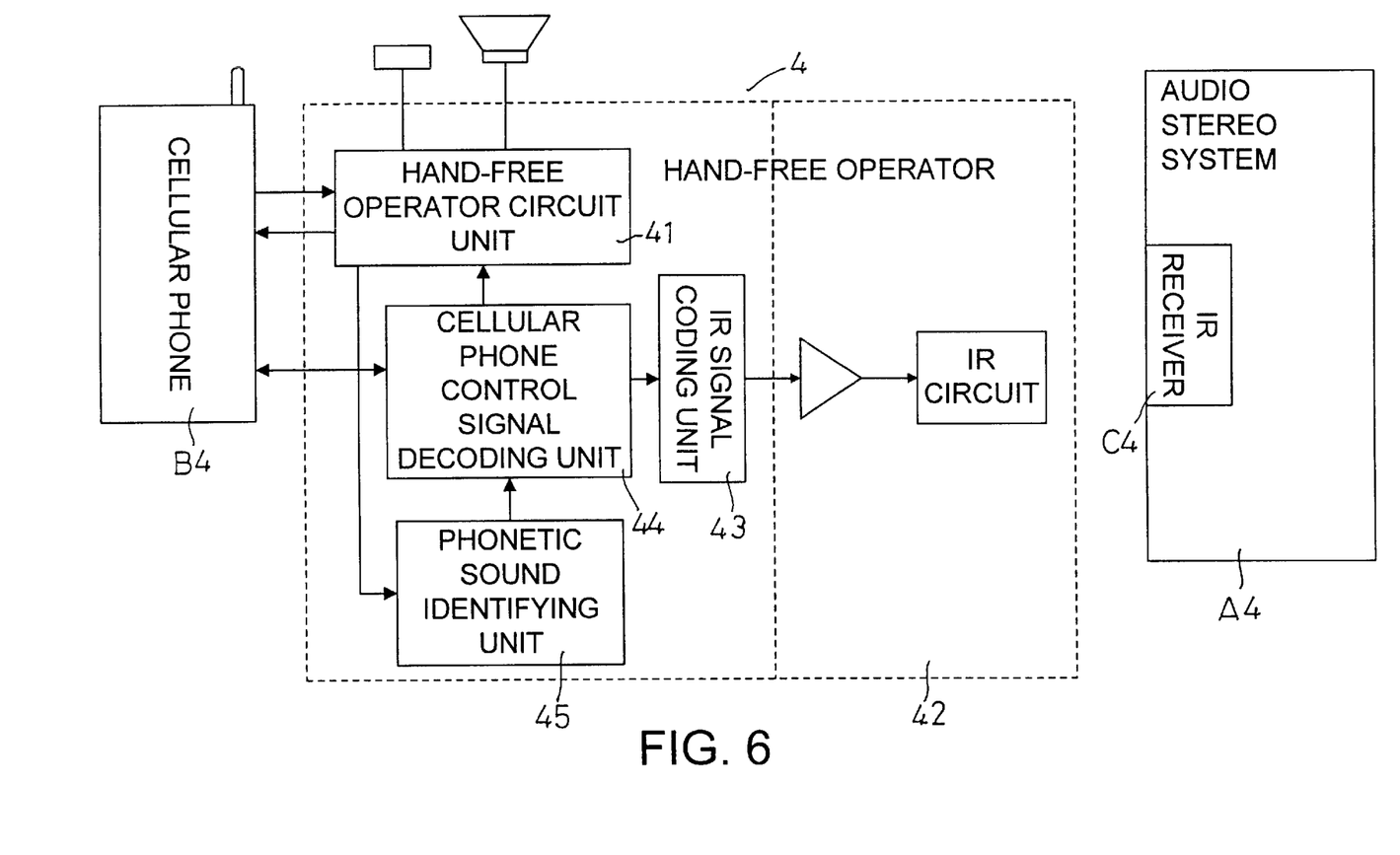
FIG. 6 is a block diagram showing a fourth embodiment of the present invention.

Referring further to FIG. 6, the block diagram of the fourth embodiment of the present invention is illustrated. To help a driver concentrate on the road situations in driving, this embodiment can employ phonetic sound control art to control a vehicle audio stereo system A4, a cellular phone B4 and etc. It mainly installs in a hand-free operator embodiment 4 an extra phonetic sound identifying unit 45 in addition to a hand-free circuit unit 41, an infrared circuit unit 42, an infrared signal coding unit 43 and a cellular phone control signal decoding unit 44. The phonetic sound identifying unit 45 is internally stored with signal identifying codes relating to phonetic sound control signals, such as the volume level CD, AM or FM and etc. Also in the infrared signal coding unit 43 are stored the infrared codes in correspondence to volume level, CD, AM or FM. Thereby, a person can perform a dialing operation on a cellular phone by way of phonetic sound or make adjustment control on functional modes of a vehicle audio stereo system. These controls ranges from the variation of the volume level of the audio stereo system to the switching of channels of radio or shift to a CD player. For instance, when a person says "loud" to the hand-free operator embodiment 4, the phonetic sound identifying unit 45 receiving such a command will process judgement and then transmit the signal to the infrared signal coding unit 43. The infrared signal coding unit 43 is activated to issue an infrared signal which is capable of controlling the vehicle audio stereo system A4, then the infrared circuit unit 42 transmits a corresponding signal to the infrared receiver C4 to control the volume of the vehicle audio stereo system.

Figure 7:
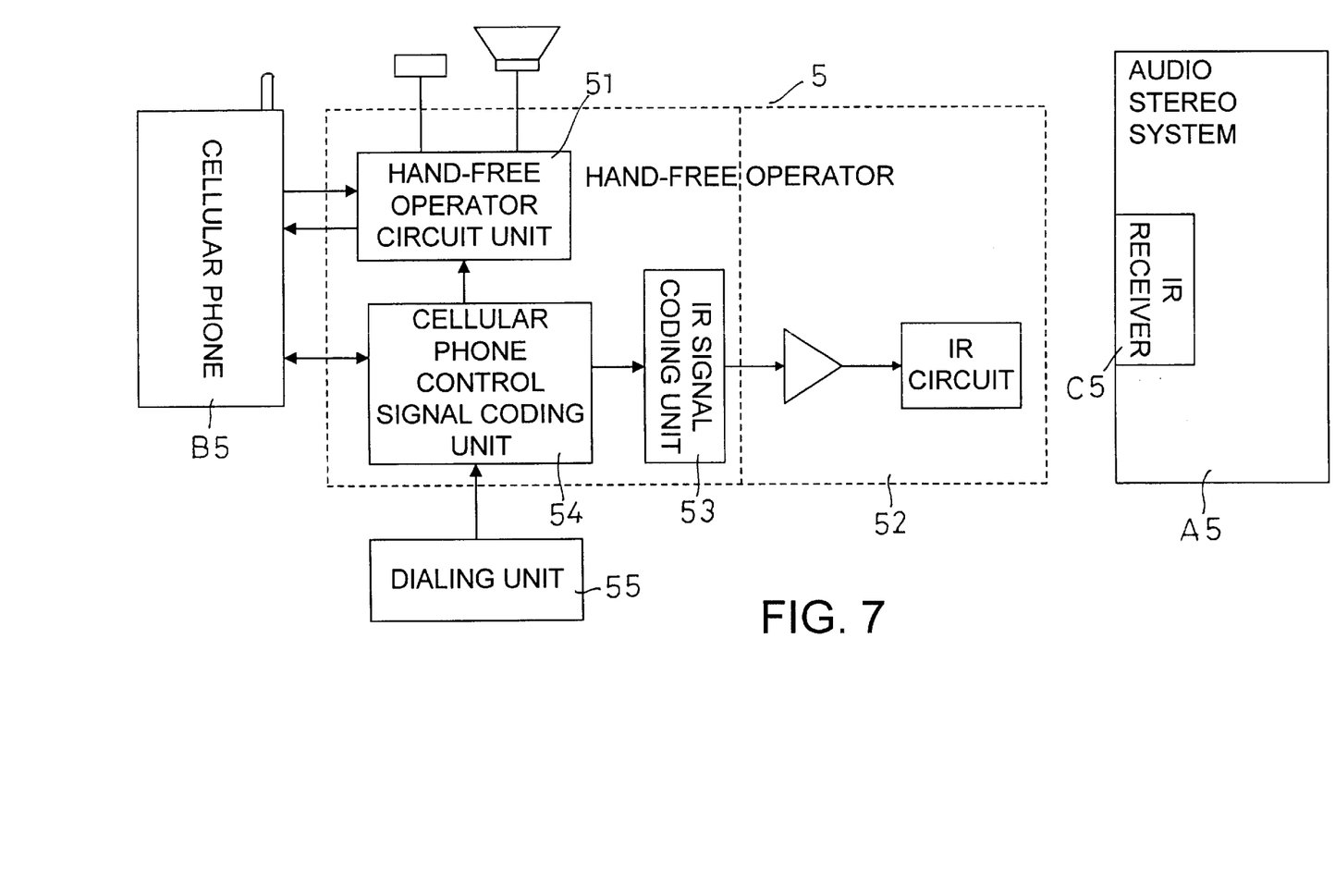
FIG. 7 is a diagram showing a fifth embodiment of the present invention.

Referring to FIG. 7, the block diagram of the fifth embodiment of the present invention. A steering wheel is a place where a driver's hands lays in the longest time in driving, so, it is the most ideal place to position all the functional controls on a steering wheel of a vehicle. In the hand-free operator embodiment 5, there is installed, in addition to the hand-free operator circuit unit 51, the infrared circuit 52, the infrared signal coding unit 53 and cellular phone control signal coding unit 54, a dialing unit 55. The dialing unit 55 placed at a proper position on the steering wheel is provided not only with the numeral buttons for dialing purposed but also with functional control buttons relating to the vehicle audio stereo system. When a person uses the dialing unit 55 to make a setting, the dialing unit 55 will transmit signals to the infrared. signal coding unit 53 to get corresponding infrared control signals coded. These coded signals will then be transmitted by the infrared circuit unit 52 to the infrared receiver C5 of the vehicle audio stereo system to effect control of the functions of the audio stereo system A5.

Figure 8:
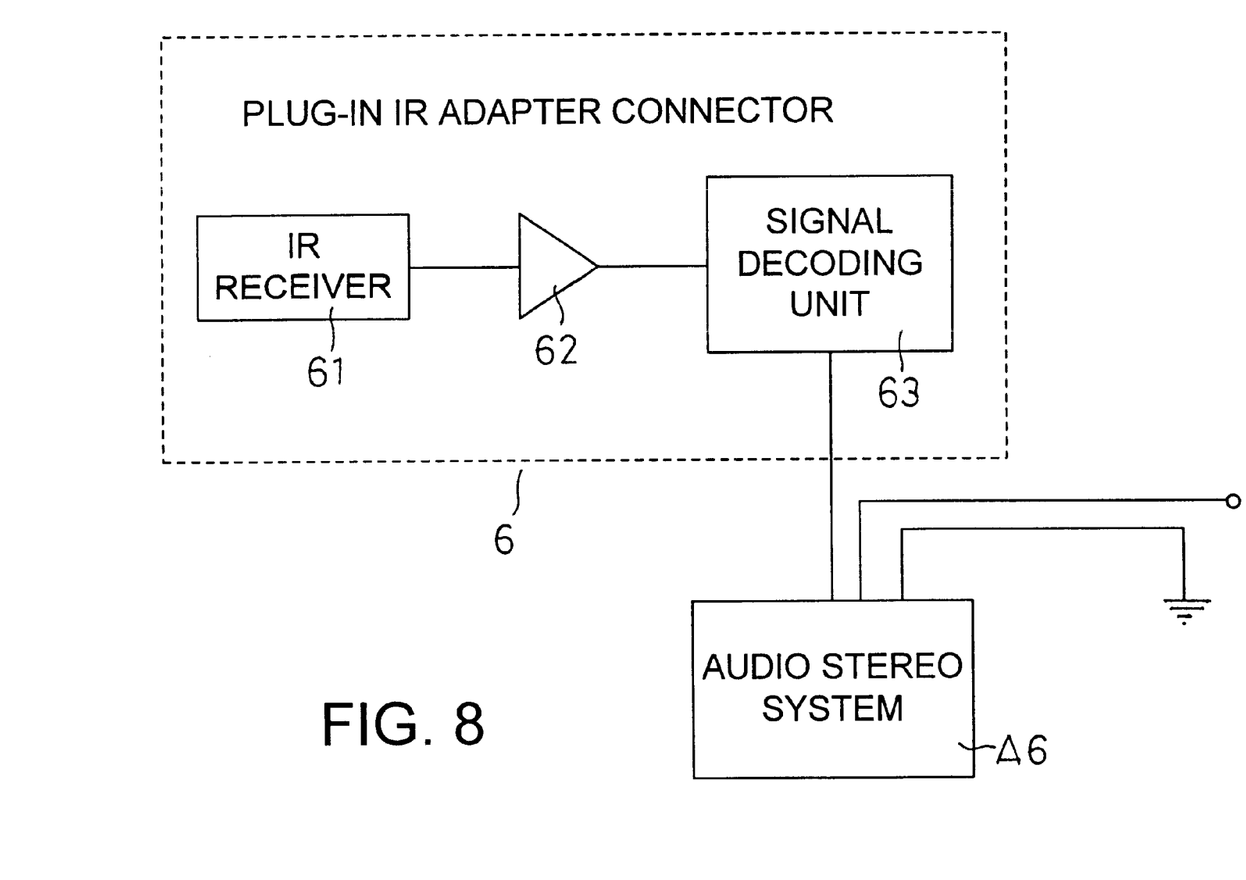
FIG. 8 is a diagram showing a sixth embodiment of the present invention.

At last, as in FIG. 8 is shown the block diagram of the sixth embodiment of the present invention. In the preceding instances, all possible conditions have been taken into consideration to solve all kinds of problems, but it is a priority that a vehicle audio stereo system must be equipped with an infrared operated means. So, to make the present invention applicable to all non-infrared controlled audio stereo systems A6, in the sixth embodiment of the present invention is provided with an plug-in infrared adapter connector 6. Such an adapter connector 6 is made up of an infrared receiver 61, a signal amplifier 62 and a signal decoding unit 63. The infrared receiver 61 is responsible for receiving infrared control signals and the signal decoding unit 63 plays the role of decoding and transforming the received infrared signals into signals for use in the control of the vehicle audio stereo system A6. By means of the conversion of the adapter connector 6, any non-infrared controlled audio stereo system can be easily compatible with the present invention in practical use.

In summary, all the preceding instances of the present invention demonstrate simple but complete considerations for wide application of the hand-free operator capable of infrared controlling a vehicle audio stereo system to all kinds of situations. It can be adapted for different people and effectively advance a hand-free operator and make driving on road safer and more facilitating.

I claim:

1. A hand-free operator coupled to a cellular phone through a signal cable for control of an audio stereo system of a vehicle, the audio stereo system having an infrared receiver, the hand-free operator comprising:

a hand-free operator circuit unlit connected to said signal cable for receiving a signal from the cellular phone indicative of a mode of operation thereof, said hand-free operator circuit unit generating a command corresponding to said mode of operation of said cellular phone;

an infra-red circuit unit coupled to said hand-free operator circuit for receiving said command therefrom and for generating an infra-red signal in response to said command, said infra-red circuit unit transmitting said infra-red signal to said infra-red receiver of said audio stereo system through an optical communication link for controlling the functions of said audio stereo system in response to said mode of operation of said cellular phone;

a phonetic sound identifying unit having signal identification codes stored therein, said vehicle audio stereo system and said cellular phone being controlled by a user by inputting phonetic sound control commands into said hand-free operator.

2. The hand-free operator as claimed in claim 1, further including an infrared signal coding unit and an income signal detecting unit coupled between said cellular phone and said first infrared signal coding unit, said income signal detecting unit detecting variations in a signal received from said cellular phone to activate said hand-free operator.

3. The hand-free operator as claimed in claim 1, further including an infrared signal coding unit and a cellular phone signal decoding unit coupled between said cellular phone and said infrared signal coding unit to enable said hand-free operator to detect variations in a serial signal of a stand-by mode of operation of said cellular phone to activate said hand-free operator.

4. The hand-free operator as claimed in claim 1, further including a dialing unit secured on a steering wheel of said vehicle, said dialing unit having a plurality of dialing buttons and a plurality of functional control buttons actuatable to control said vehicle audio stereo system and said cellular phone.

5. The hand-free operator as claimed in claim 1, further including an adaptor connector comprising said infrared receiver of said audio stereo system, a signal amplifier coupled to said infrared receiver, and a signal decoding unit connected at an input thereof to said signal amplifier, and coupled at an output thereof to said audio stereo system of said vehicle.

6. The hand-free operator as recited in claim 1 wherein a cellular phone signal decoding unit is coupled between said phonetic sound identifying unit and said hand-free operator circuit unit.

7. The hand-free operator as recited in claim 6 wherein an infrared signal coding unit is coupled to said cellular phone signal decoding unit, said infrared signal coding unit having infrared signal codes stored therein.

* * * * *